(12) United States Patent
Jones

(10) Patent No.: US 7,713,314 B2
(45) Date of Patent: May 11, 2010

(54) BIODIESEL CANDLE

(76) Inventor: Allen Jones, 190 Windsor Green Dr., Clayton, NC (US) 27527

(*) Notice: Subject to any disclaimer, the term of this patent is extended or adjusted under 35 U.S.C. 154(b) by 387 days.

(21) Appl. No.: 11/738,479

(22) Filed: Apr. 21, 2007

(65) Prior Publication Data

US 2008/0256844 A1 Oct. 23, 2008

(51) Int. Cl.
*C11C 5/00* (2006.01)

(52) U.S. Cl. .......................................... 44/275; 431/288

(58) Field of Classification Search .................... 44/275
See application file for complete search history.

(56) References Cited

U.S. PATENT DOCUMENTS

| | | |
|---|---|---|
| 5,389,113 A | 2/1995 | Demmering et al. |
| 5,424,467 A | 6/1995 | Bam et al. |
| 5,525,126 A | 6/1996 | Basu et al. |
| 5,573,700 A | 11/1996 | Steltenkamp et al. |
| 5,578,090 A | 11/1996 | Bradin |
| 5,589,181 A | 12/1996 | Bencsits |
| 5,594,029 A | 1/1997 | Bencits |
| 5,713,965 A | 2/1998 | Foglia et al. |
| 6,001,874 A | 12/1999 | Veierov |
| 6,015,440 A | 1/2000 | Noureddini |
| 6,174,501 B1 | 1/2001 | Noureddini |
| 6,203,585 B1 | 3/2001 | Majerczak |
| 6,235,104 B1 | 5/2001 | Chattopadhyay et al. |
| 6,306,415 B1 | 10/2001 | Reifenrath |
| 6,398,707 B1 | 6/2002 | Wu et al. |
| 6,399,800 B1 | 6/2002 | Haas et al. |
| 6,437,001 B1 | 8/2002 | Roe |
| 6,444,216 B2 | 9/2002 | Reifenrath |
| 6,551,365 B2 * | 4/2003 | Berger et al. .................. 44/275 |
| 6,797,673 B1 | 9/2004 | Worthley et al. |
| 6,800,662 B2 | 10/2004 | Roe |
| 6,953,814 B2 | 10/2005 | Reifenrath |
| 7,160,337 B2 * | 1/2007 | Williams et al. .............. 44/275 |
| 2006/0127434 A1 | 6/2006 | Jones, Jr. |

FOREIGN PATENT DOCUMENTS

WO WO2004046286 * 6/2004

OTHER PUBLICATIONS

"Biodiesel Production", "Found online Jul. 27, 2005 at http://www.biodiesel.org/pdf_files/fuelfactsheets/Production. PDF", Jul. 27, 2005, Publisher: National Biodiesel Board.

Korus, Roger A., et al., "Transesterification process to manufacture ethyl ester of rape oil", "Proceedings of the First Biomass Conference of the Americas: Energy, Environment, Agriculture and Industry, vol. II", 1993, pp. 815-826, Publisher: National Renewable Energy Laboratory, Published in: Golden, CO.

(Continued)

*Primary Examiner*—Cephia D Toomer
(74) *Attorney, Agent, or Firm*—Steven J. Hultquist; Intellectual Property/Technology Law

(57) ABSTRACT

A candle formed of a composition comprising biodiesel. In preferred implementations, the candle composition includes fatty alcohols, e.g., cetyl alcohol and cetearyl alcohol, in mixture with the biodiesel, to constitute a candle composition that can burned in a wicked or wickless form. The composition of biodiesel and fatty alcohols may include dyes and/or fragrances, to provide a candle article that is environmentally benign and of low cost.

34 Claims, 1 Drawing Sheet

OTHER PUBLICATIONS

Proctor and Gamble Chemicals, "Material Safety Data Sheet for CE-1618, CE-1618 Kosher, CE-1618LG", Jul. 21, 2004.

Schuchardt, Ulf, et al., "Transesterification of vegetable oils: A review", "J. Braz. Chem. Soc.", 1998, pp. 199-210, vol. 9, No. 1.

Tomah Products, Inc., "Material Safety Data Sheet for TOMADOL 1-5", Apr. 29, 2005.

* cited by examiner

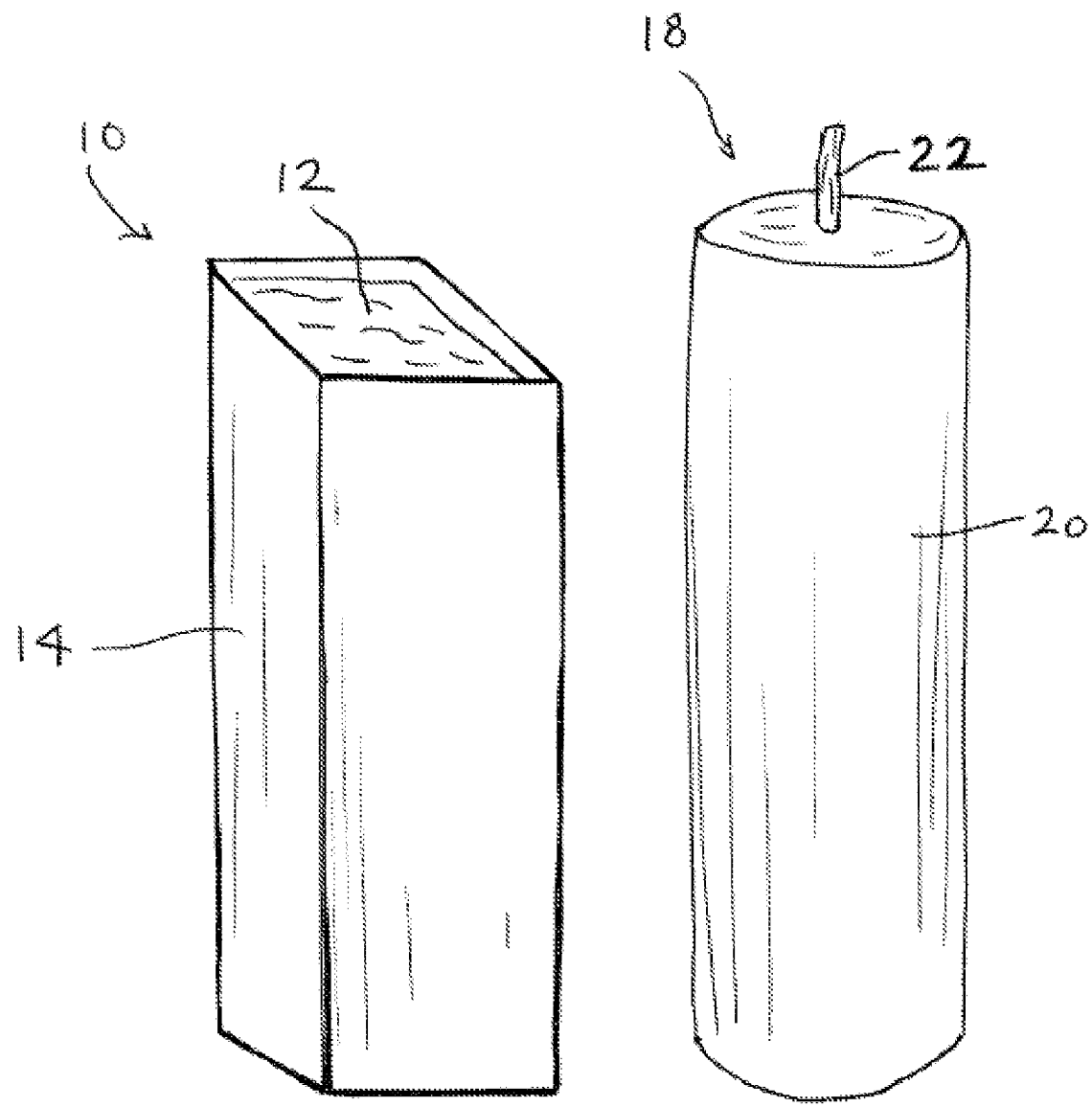
FIG. 1 FIG. 2

BIODIESEL CANDLE

FIELD OF THE INVENTION

The present invention relates to a biodiesel-based luminophoric material and to a candle formed of such material.

DESCRIPTION OF THE RELATED ART

Candles have historically been used as a simple and economic means of lighting. Conventionally, candles have been constructed with a body of a fuel material, e.g., of tallow, paraffin, beeswax or other wax, with a wick that is lighted to vaporize the fuel material and generate a flame.

Candles have enjoyed a resurgence in recent years as illumination sources. Concurrently, there is a trend in manufactured consumer products generally to utilize "greener," recycled, and more ecologically compatible materials.

The present invention addresses this need.

SUMMARY OF THE INVENTION

The present invention relates to a biodiesel-based luminophoric material and to a candle formed of such material.

In one aspect, the invention relates to a candle formed of a composition comprising biodiesel.

In another aspect, the invention relates to a candle formed of material comprising (i) esters of fatty acids and (ii) fatty alcohols.

Another aspect of the invention relates to a biodiesel candle comprising a candle body formed of a composition containing one or more mono alkyl esters selected from the group consisting of soybean oil methyl ester, soybean oil ethyl ester, soybean oil propyl ester, coconut oil methyl ester, coconut oil ethyl ester, coconut oil propyl ester, palm oil methyl ester, palm oil ethyl ester, palm oil propyl ester, cotton seed oil methyl ester, cotton seed oil ethyl ester, cotton seed oil propyl ester, wheat germ methyl ester, wheat germ ethyl ester, wheat germ propyl ester, olive oil methyl ester, olive oil ethyl ester, olive oil propyl ester, corn oil methyl ester, corn oil ethyl ester, corn oil propyl ester, sunflower oil methyl ester, sunflower oil ethyl ester, sunflower oil propyl ester, safflower oil methyl ester, safflower oil ethyl ester, safflower oil propyl ester, rapeseed oil methyl ester, rapeseed oil ethyl ester, rapeseed oil propyl ester, mustard oil methyl ester, mustard oil ethyl ester, mustard oil propyl ester, jatropha methyl ester, jatropha ethyl ester, jatropha propyl ester, algae methyl ester, algae ethyl ester, algae propyl ester, tallow methyl ester, tallow ethyl ester, tallow propyl ester, methyl palmitate, ethyl palmitate, propyl palmitate, methyl stearate, ethyl stearate, propyl stearate, methyl oleate, ethyl oleate, propyl oleate, methyl linoleate, ethyl linoleate, and propyl linoleate.

A further as the invention relates to a biodiesel candle comprising a candle body formed of a composition containing one or more compounds selected from the group consisting of hexanoic acid, heptanoic acid, octanoic acid, nonanoic acid, decanoic acid, undecanoic acid, dodecanoic acid, methyl hexanoate, methyl heptanoate, methyl octanoate, methyl nonanoate, methyl decanoate, methyl undecanoate, and methyl dodecanoate, ethyl hexanoate, ethyl heptanoate, ethyl octanoate, ethyl nonanoate, ethyl decanoate, ethyl undecanoate, and ethyl dodecanoate, propyl hexanoate, propyl heptanoate, propyl octanoate, propyl nonanoate, propyl decanoate, propyl undecanoate, and propyl dodecanoate.

A further aspect of the invention relates to a candle comprising a candle body formed of a composition comprising fatty acid esters and fatty alcohols, optionally with fragrance and/or dye compounds.

In another aspect, the invention relates to a candle comprising a candle body formed of a composition including 40-75% by weight of biodiesel, 5-20% by weight cetyl alcohol, and 20-40% by weight cetearyl alcohols, based on the weight of the biodiesel, cetyl alcohol and cetearyl alcohol, where the amounts of all such components total to 100 weight percent.

Another aspect of the invention relates to a candle comprising a candle body formed of a composition including 60% biodiesel, 8% cetyl alcohol, 30% cetearyl alcohol, 2% fragrances, and an optional wick.

In another aspect, the invention relates to a wickless candle comprising a composition consisting essentially of (i) fatty acid esters and (ii) fatty alcohols.

Still another aspect of the invention relates to a wickless candle consisting of (i) fatty acid esters, and (ii) fatty alcohols.

A further aspect of the invention relates to a wickless candle consisting of (i) fatty acid esters, (ii) fatty alcohols, and (iii) fragrance compounds.

Yet another aspect of the invention relates to a wickless candle consisting of (i) fatty acid esters, (ii) fatty alcohols, (iii) fragrance compounds, and (iv) dye compounds.

In another aspect, the invention relates to a candle consisting essentially of a biodiesel/fatty alcohol blend.

Other aspects, features and embodiments of the invention will be more fully apparent from the ensuing disclosure and appended claims.

BRIEF DESCRIPTION OF THE DRAWINGS

FIG. 1 is a schematic representation of a biodiesel candle according to one embodiment of the invention.

FIG. 2 is a schematic representation of a biodiesel candle according to another embodiment of the invention.

DETAILED DESCRIPTION OF THE INVENTION, AND PREFERRED EMBODIMENTS THEREOF

The present invention relates to relates to a biodiesel-based luminophoric material and to a candle formed of such material.

The invention is based on the discovery that biodiesel material can be usefully employed as a fuel material for candles, including, in one aspect of the invention, wickless candles.

As used herein, the term "biodiesel" refers to alkyl esters produced from the transesterification of vegetable oils or animal fats. A preferred candle material includes fatty acid esters and fatty alcohols.

As used herein, the term "fatty acids" refers to alkyl chains having a carboxylic acid substituent at one end of the alkyl chain and a methyl ($CH_3$) substituent at the other end of the alkyl chain. Such fatty acids may be saturated or unsaturated. The term "long chain fatty acids" as used herein refers to alkyl chains having 14 to 24 carbon atoms. Fatty acids of fewer than fourteen carbon atoms are referred to herein by their carboxylic acid name, such as hexanoic acid, heptanoic acid, octanoic acid, nonanoic acid, decanoic acid, undecanoic acid, dodecanoic acid, etc.

The invention in one aspect relates to wicked or wickless candles variously comprising, consisting or consisting essentially of biodiesel and fatty alcohols.

Another aspect of the invention relates to a candle having a main body portion comprising, consisting or consisting essentially of monoalkyl fatty acid esters and fatty alcohols.

Candles of the invention can be wicked or wickless candles, formed of a biodiesel/fatty alcohol blend, and optionally containing fragrance component(s). The biodiesel/fatty alcohols blend may include biodiesel in an amount of from 1 to 99% by weight, based on the total weight of biodiesel and fatty alcohols.

In specific embodiments, the biodiesel component may be present in an amount of from 2 to 99% by weight, based on the total weight of biodiesel and fatty alcohols, or such weight percentage of biodiesel to the total weight of biodiesel and fatty alcohols may be in a range of from 5 to 95%, 10 to 90%, 15 to 80%, 20 to 75%, 30 to 70%, 40 to 60%, 45 to 55%, or other appropriate range, depending on the specific requirements of the candle.

Other aspects, features and embodiments of the invention will be more fully apparent from the ensuing disclosure and appended claims.

DETAILED DESCRIPTION OF THE INVENTION AND PREFERRED EMBODIMENTS THEREOF

The present invention relates to candles formed of material comprising biodiesel, e.g., candles comprising (i) esters of fatty acids and (ii) fatty alcohols.

In various embodiments, the esters comprise mono alkyl esters of long chain fatty acids.

The candle material can, for example, comprise, consist or consist essentially of one or more mono alkyl esters selected from the group consisting of $C_{14}$-$C_{24}$ saturated methyl esters, $C_{14}$-$C_{24}$ unsaturated methyl esters, $C_{14}$-$C_{24}$ saturated ethyl esters, $C_{14}$-$C_{24}$ unsaturated ethyl esters, and $C_{14}$-$C_{24}$ saturated propyl esters and $C_{14}$-$C_{24}$ unsaturated propyl esters.

In various formulations, the candle material includes one or more mono alkyl esters selected from the group consisting of $C_{16}$-$C_{18}$ saturated methyl esters, $C_{18}$ unsaturated methyl esters, $C_{16}$-$C_{18}$ saturated ethyl esters, $C_{18}$ unsaturated ethyl esters, $C_{16}$-$C_{18}$ saturated propyl esters and $C_{18}$ unsaturated propyl esters.

As used herein, the designation of organo substituents by reference to carbon numbers, includes ranges as well as sub-ranges within the ranges identified by end-point carbon numbers, and such sub-ranges may be specified, e.g., as including one of such end-point carbon numbers in such a sub-range, or as including carbon numbers greater than the lower end-point carbon number and less than the upper end-point carbon number of the range, to constitute various sub-ranges in the various specific embodiments of the invention. Alkyl groups may be branched or unbranched.

The long chain fatty acids in specific embodiments may comprise fatty acids selected from among vegetable oil long chain fatty acids, animal source long chain fatty acids, and mixtures thereof. In specific compositions, the candle may, for example, comprise one or more mono alkyl esters selected from the group consisting of soybean oil methyl ester, soybean oil ethyl ester, soybean oil propyl ester, coconut oil methyl ester, coconut oil ethyl ester, coconut oil propyl ester, palm oil methyl ester, palm oil ethyl ester, palm oil propyl ester, cotton seed oil methyl ester, cotton seed oil ethyl ester, cotton seed oil propyl ester, wheat germ methyl ester, wheat germ ethyl ester, wheat germ propyl ester, olive oil methyl ester, olive oil ethyl ester, olive oil propyl ester, corn oil methyl ester, corn oil ethyl ester, corn oil propyl ester, sunflower oil methyl ester, sunflower oil ethyl ester, sunflower oil propyl ester, safflower oil methyl ester, safflower oil ethyl ester, safflower oil propyl ester, rapeseed oil methyl ester, rapeseed oil ethyl ester, rapeseed oil propyl ester, mustard oil methyl ester, mustard oil ethyl ester, mustard oil propyl ester, jatropha methyl ester, jatropha ethyl ester, jatropha propyl ester, algae methyl ester, algae ethyl ester, algae propyl ester, tallow methyl ester, tallow ethyl ester, tallow propyl ester, methyl palmitate, ethyl palmitate, propyl palmitate, methyl stearate, ethyl stearate, propyl stearate, methyl oleate, ethyl oleate, propyl oleate, methyl linoleate, ethyl linoleate, and propyl linoleate. In specific compositions, the carrier comprises material identified by Chemical Abstracts Registry Number (CAS#) 67784-80-9 or material identified by Chemical Abstracts Registry Number (CAS#) 6772-38-3. As used herein, the term "soybean oil esters" is synonymous with soybean esters and also is synonymous with soy esters.

The candle compositions of the invention may further include one or more ingredients selected from the group consisting of fillers, dispersants, water, non-aqueous solvent media, surfactants, suspension agents, stabilizers, preservatives, dyes, pigments, masking agents, emollients, excipients, and the like. In various specific embodiments, the candle composition comprises at least one additional ingredient selected from the group consisting of lauric acid, olefin sulfanate, pegylated castor oil, cyclomethicone, cedarwood oil, citric acid, water, lemongrass oil, and benzoic acid.

The candle compositions of the present invention can be of any suitable type and may, for example, include one or more compounds selected from the group consisting of hexanoic acid, heptanoic acid, octanoic acid, nonanoic acid, decanoic acid, undecanoic acid, dodecanoic acid, methyl hexanoate, methyl heptanoate, methyl octanoate, methyl nonanoate, methyl decanoate, methyl undecanoate, and methyl dodecanoate, ethyl hexanoate, ethyl heptanoate, ethyl octanoate, ethyl nonanoate, ethyl decanoate, ethyl undecanoate, and ethyl dodecanoate, propyl hexanoate, propyl heptanoate, propyl octanoate, propyl nonanoate, propyl decanoate, propyl undecanoate, and propyl dodecanoate. In various specific embodiments, the candle material can be or include hexanoic acid, octanoic acid, decanoic acid, dodecanoic acid, methyl hexanoate, methyl octanoate, methyl decanoate, and/or methyl dodecanoate.

The candle composition in specific embodiments includes a candle article formed of a candle composition consisting essentially of fatty acid esters and fatty alcohols.

In other embodiments, the candle may be constituted so as to be devoid of components such as wicks, resin materials, polyamide resin materials, polymers, thermoplastic polymers, gels, ester terminated polyamide gels, gelling agents, paraffin, paraffin wax, beeswax, montan wax, fatty esters, microcrystalline wax, polysaccharadic materials, polyethylene, cellulosic materials and fillers, and natural and synthetic resins.

In still further embodiments, the candle composition may include a colorant, an odorant, a wick, or other materials that do not preclude the efficacy of the candle composition for its intended purpose.

In one preferred embodiment, the candle article comprises a main candle body formed of a composition comprising, consisting or consisting essentially of fatty acid esters and fatty alcohols, optionally with fragrance and/or dye compounds.

A further specific embodiment relates to a candle article comprising a main candle body formed of composition comprising, consisting or consisting essentially of a biodiesel/fatty alcohol blend. The biodiesel may comprise, consist or consist essentially of mono alkyl esters of fatty acids.

The candle composition in a specific aspect includes 40-75% by weight of biodiesel, 5-20% by weight cetyl alcohol, and 20-40% by weight cetearyl alcohols, based on the weight of the biodiesel, cetyl alcohol and cetearyl alcohol, where the amounts of all such components total to 100 weight percent.

In one specific embodiment of the present invention, the candle may for example include 60% biodiesel, 8% cetyl alcohol, 30% cetearyl alcohol, 2% fragrances, and an optional wick.

It will be recognized that the specific composition of the candle in the practice of the present invention may vary substantially, as regards the particular biodiesel and fatty alcohol components. The candle composition can be readily formed by mixing biodiesel and fatty alcohols in the desired proportions with one another to form a homogeneous candle composition, with shaping of the mixture to a desired form or conformation. The composition may be cast or molded to provide a candle article of a desired character.

Referring now to the drawings, FIG. 1 is a perspective view of a wickless biodiesel candle assembly 10 according to one embodiment of the invention. The candle assembly 10 includes a non-flammable casing 14 in which is contained a candle body 12 formed of a biodiesel/fatty alcohols composition 12. The candle body can be ignited, e.g., by placement of a flame from a match or a hand-operated butane lighter, in lighting proximity to the surface of the candle body in the casing.

FIG. 2 is a perspective view of a wicked candle article 18 including a candle body 20 formed of a biodiesel/fatty alcohols composition. In the candle article illustrated in FIG. 2, a wick 22 is disposed in a central portion of the candle body and may be lit by application of a flame to the wick.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A candle formed of a composition comprising biodiesel and fatty alcohols including 5-20% by weight cetyl alcohol and 20-40% by weight cetearyl alcohol, based on total weight of said biodiesel, cetyl alcohol and cetearyl alcohol.

2. The candle of claim 1, wherein the candle composition comprises at least one soybean oil ester in said biodiesel.

3. The candle of claim 2, wherein said candle is wickless.

4. The candle of claim 2, wherein said candle further comprises a wick.

5. The candle of claim 1, wherein the composition is contained in a casing.

6. The candle of claim 1, wherein the composition consists of said biodiesel and fatty alcohols.

7. The candle of claim 1, wherein the composition consists essentially of said biodiesel and fatty alcohols.

8. The candle of claim 1, wherein the biodiesel in said composition contains monoalkyl fatty acid esters.

9. The candle of claim 1, wherein the composition comprises biodiesel in an amount of from 1 to 99% by weight, based on the total weight of biodiesel and fatty alcohols.

10. The candle of claim 1, wherein the composition comprises biodiesel in an amount of from 2 to 99% by weight, based on the total weight of biodiesel and fatty alcohols.

11. The candle of claim 1, wherein the composition comprises (i) mono alkyl esters of the fatty acids and (ii) said fatty alcohols.

12. The candle of claim 11, wherein the mono alkyl esters of fatty acids comprise mono alkyl esters of long chain fatty acids.

13. The candle of claim 12, wherein the mono alkyl esters comprise esters selected from the group consisting of $C_{14}$-$C_{24}$ saturated methyl esters, $C_{14}$-$C_{24}$ unsaturated methyl esters, $C_{14}$-$C_{24}$ saturated ethyl esters, $C_{14}$-$C_{24}$ unsaturated ethyl esters, and $C_{14}$-$C_{24}$ saturated propyl esters and $C_{14}$-$C_{24}$ unsaturated propyl esters, $C_{16}$-$C_{18}$ saturated methyl esters, $C_{18}$ unsaturated methyl esters, $C_{16}$-$C_{18}$ saturated ethyl esters, $C_{18}$ unsaturated ethyl esters, $C_{16}$-$C_{18}$ saturated propyl esters and $C_{18}$ unsaturated propyl esters.

14. The candle of claim 12, wherein the mono alkyl esters comprise esters selected from the group consisting of vegetable oil long chain fatty acids, animal source long chain fatty acids, and mixtures thereof.

15. The candle of claim 1, wherein the biodiesel contains one or more mono alkyl esters selected from the group consisting of soybean oil methyl ester, soybean oil ethyl ester, soybean oil propyl ester, coconut oil methyl ester, coconut oil ethyl ester, coconut oil propyl ester, palm oil methyl ester, palm oil ethyl ester, palm oil propyl ester, cotton seed oil methyl ester, cotton seed oil ethyl ester, cotton seed oil propyl ester, wheat germ methyl ester, wheat germ ethyl ester, wheat germ propyl ester, olive oil methyl ester, olive oil ethyl ester, olive oil propyl ester, corn oil methyl ester, corn oil ethyl ester, corn oil propyl ester, sunflower oil methyl ester, sunflower oil ethyl ester, sunflower oil propyl ester, safflower oil methyl ester, safflower oil ethyl ester, safflower oil propyl ester, rapeseed oil methyl ester, rapeseed oil ethyl ester, rapeseed oil propyl ester, mustard oil methyl ester, mustard oil ethyl ester, mustard oil propyl ester, jatropha methyl ester, jatropha ethyl ester, jatropha propyl ester, algae methyl ester, algae ethyl ester, algae propyl ester, tallow methyl ester, tallow ethyl ester, tallow propyl ester, methyl palmitate, ethyl palmitate, propyl palmitate, methyl stearate, ethyl stearate, propyl stearate, methyl oleate, ethyl oleate, propyl oleate, methyl linoleate, ethyl linoleate, and propyl linoleate.

16. The candle of claim 1, wherein the candle composition contains one or more compounds selected from the group consisting of hexanoic acid, heptanoic acid, octanoic acid, nonanoic acid, decanoic acid, undecanoic acid, dodecanoic acid, methyl hexanoate, methyl heptanoate, methyl octanoate, methyl nonanoate, methyl decanoate, methyl undecanoate, and methyl dodecanoate, ethyl hexanoate, ethyl heptanoate, ethyl octanoate, ethyl nonanoate, ethyl decanoate, ethyl undecanoate, and ethyl dodecanoate, propyl hexanoate, propyl heptanoate, propyl octanoate, propyl nonanoate, propyl decanoate, propyl undecanoate, and propyl dodecanoate.

17. The candle of claim 1, wherein the candle is devoid of wicks, resin materials, polyamide resin materials, polymers, thermoplastic polymers, gels, ester terminated polyamide gels, gelling agents, paraffin, paraffin wax, beeswax, montan wax, microcrystalline wax, polysaccharadic materials, polyethylene, cellulosic materials and fillers, and natural and synthetic resins.

18. The candle of claim 1, further comprising at least one of colorants, odorants, and a wick.

19. The candle of claim 1, further comprising fragrance and/or dye compounds.

20. A candle comprising a candle body formed of a composition including 40-75% by weight of biodiesel, 5-20% by weight cetyl alcohol, and 20-40% by weight cetearyl alcohols, based on the weight of the biodiesel, cetyl alcohol and cetearyl alcohol, where the amounts of all such components total to 100 weight percent.

21. The candle of claim 1, comprising a candle body formed of a composition including 60% biodiesel, 8% cetyl alcohol, 30% cetearyl alcohol, 2% fragrances, and an optional wick.

22. The candle of claim 1, wherein the candle is wickless.

23. The candle of claim 22, wherein the candle is devoid of components selected from the group consisting of wicks, resin materials, polyamide resin materials, polymers, thermoplastic polymers, gels, ester terminated polyamide gels, gelling agents, paraffin, paraffin wax, beeswax, montan wax, microcrystalline wax, polysaccharadic materials, polyethylene, cellulosic materials and fillers, and natural and synthetic resins.

24. The candle of claim 22, further comprising a colorant.

25. The candle of claim 22, further comprising an odorant.

26. The candle of claim 1, wickless and consisting of (i) biodiesel fatty acid esters, and (ii) said fatty alcohols.

27. The candle of claim 1, wickless and consisting of (i) biodiesel fatty acid esters, (ii) said fatty alcohols, and (iii) fragrance compounds.

28. The candle of claim 1, wickless and consisting of (i) biodiesel fatty acid esters, (ii) fatty alcohols, (iii) fragrance compounds, and (iv) dye compounds.

29. The candle of claim 1, consisting essentially of said biodiesel/fatty alcohol blend.

30. The candle of claim 29, wherein the biodiesel consists of mono alkyl esters of fatty acids.

31. The candle of claim 29, wherein the biodiesel has a weight percent in a range of from 40% to 80%, based on the total weight of the biodiesel/fatty acid blend.

32. The candle of claim 29, wherein the biodiesel has a weight percent in a range of from 55% to 65%.

33. A candle consisting essentially of a biodiesel/fatty alcohol blend, wherein the fatty alcohols include cetyl alcohol at a weight percentage in a range of from 2% to 15%, and cetearyl alcohol at a weight percentage in a range of from 10% to 40%.

34. The candle of claim 1, wherein the composition comprises biodiesel in an amount of from 50 to 80% by weight, based on the total weight of biodiesel and fatty alcohols.

* * * * *